United States Patent Office 2,882,248
Patented Apr. 14, 1959

2,882,248

ION EXCHANGE SUBSTANCES BY SAPONIFICATION OF ALLYL PHOSPHATE POLYMERS

John Kennedy, Harwell, England, assignor, by mesne assignments, to the United States of America as represented by the United States Atomic Energy Commission No Drawing. Application September 7, 1954
Serial No. 454,624

2 Claims. (Cl. 260—2.2)

This invention relates to ion exchange substances of the cationic type.

The object of the invention is to provide a cationic exchange resin which exhibits a relatively high adsorption of the uranyl ion compared with that of many common cations.

According to the invention an ion exchange resin comprises an alphyl-allyl hydrogen phosphate polymer, the alphyl group being either allyl or a lower alkyl group having up to 5 carbon atoms, such as methyl or ethyl. The allyl groups in the resin may carry hydro-carbon substituents.

Also in accordance with the invention an ion exchange resin is prepared by partially hydrolysing an alkyl-diallyl phosphate polymer or a triallyl phosphate polymer, to bring about partial substitution of a cation, for example alkali metal, for allyl and/or alkyl groups.

The invention also consists in an ion exchange resin comprising a polymeric substance having a unit group of the formula

where R is an aliphatic alcohol radical containing up to five carbon atoms.

The invention also consists in a method of preparing an ion exchange resin, which comprises polymerising a compound of the class consisting of alkyl-diallyl phosphates and triallyl phosphate in the presence of a free radical generating substance and partially hydrolysing the resulting polymer to bring about partial substitution of organic radicals by cations.

The polymerisation may be carried out to produce a mass of polymer which may then be mechanically reduced to obtain granules of a desired size, which granules may be washed free of monomer and any solvent soluble impurities by refluxing them with an organic solvent for example an alcohol or a ketone, preferably ethyl alcohol or acetone. Partial hydrolysis of the granules may then be carried out by treatment with aqueous or alcoholic alkali metal hydroxide.

Alternatively the alkyl-diallyl phosphate or triallyl phosphate containing a free radical generating substance may be suspended in water and subjected to constant agitation while the water is heated to boiling under reflux until beads of the polymer are produced. The beads may then be separated from the water. After washing with an organic solvent and removal of the solvent, the beads may be subjected to partial hydrolysis with aqueous or alcohol alkali metal hydroxide to give partial substitution of alkali metal cations for organic radicals.

In either case the polymer after partial phydrolysis may be washed with water and then treated with aqueous strong mineral acid to produce the acid form of the resin.

The partial hydrolysis may be carried out by refluxing the polymer with relatively concentrated aqueous sodium hydroxide solution, for a 20 percent solution, for three or more hours, after which it may be washed with water and dried in air for 48 hours. The resin may then be repeatedly washed with mineral acid, for example N sulphuric acid and finally washed with water until the water leaving the resin is free of sulphate ions, to convert the resin to the acid form.

Preferred free radical generating agents are peroxygen compounds, dibenzoyl per oxide being preferred. A preferred temperature of treatment for the polymerisation is from 90° to 100° C.

The following are examples of a preferred way of operating according to the invention.

Example 1

10 parts by weight of triallyl phosphate containing 0.15 part by weight of dibenzoyl peroxide are placed in a glass vessel which is flushed with nitrogen or carbon dioxide and sealed. The vessel is heated to 100° C. in a water bath. Polymerisation takes place after 20 to 30 minutes and heating is continued for a further three hours. The contents of the vessel are crushed to 30 to 70 mesh size, heated for 30 minutes with 37 parts of acetone under reflux, filtered, washed with fresh acetone and again heated with fresh acetone under reflux. This operation is conducted four times after which the resin is dried by exposing it to atmosphere at room temperature for 24 hours.

The resin so produced is mainly polymerised triallyl phosphate. P (found) 14.4 percent, P (theoretical) 14.6 percent.

Example 2

100 parts by weight of triallyl phosphate containing 1.5 parts of dibenzoyl peroxide is vigorously stirred for three hours in an atmosphere of inert gas, for example nitrogen, with 50 parts of distilled water heated under reflux in a glass vessel. The beads of polymer so formed are separated from the water and subjected to treatment with acetone as described for the granules in Example 1.

Example 3

50 parts by weight of the triallyl phosphate polymer produced according to Example 1 or 2 are heated under reflux with 600 parts of 20 percent aqueous sodium hydroxide for three hours. The polymer is then filtered and washed with distilled water and dried in air for 48 hours. The resin at this stage is polymerised sodium diallyl phosphate. The latter may be converted into the acid form by repeatedly washing it with a mineral acid, preferably N sulphuric and then with water until there is no sulphate ion in the wash water leaving the polymer.

In the above examples an alkyl diallyl phosphate may be substituted for the triallyl phosphate, the alkyl group containing up to five carbon atoms, and preferably methyl or ethyl.

One gramme of the polymer, in acid form and air dried (4.5 percent moisture content), when titrated with sodium hydroxide was found to have a capacity of 4.4 m. equivalents per gramme for sodium ions and when treated with uranium in sulphate or nitrate solution at pH 1.0 has a capacity of 3.0 m. equivalent per gramme for uranium.

The order of affinity at pH 1.0 for various cations is:

In the case of known sulphonic acid ion exchange resins the order of affinity is

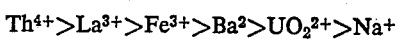

Example 4

Five parts of triallyl phosphate polymer prepared as described in Example 1 or 2 were heated under reflux with 80 parts of 20 percent alcoholic potash for 18 hours. The polymer was separated from the alcoholic potash, washed with water and dried as described in Example 3. The resulting potassium diallyl phosphate polymer may be converted into the acid form in the manner described in Example 3. The resulting resin has the same chemical properties as that produced according to Example 3.

As indicated above ferric iron is more strongly adsorbed than the uranyl ion. The latter can be eluted from the resin with aqueous ammonium carbonate solution, leaving ferric ions in the resin bed. Most of the iron may be subsequently eluted by means of dilute sulphuric acid containing sulphur dioxide.

Triallyl phosphate may be prepared in the manner described in United States of America patent specification No. 2,394,829, namely by adding to 690 parts of dry allyl alcohol, 690 parts toluene, 815 parts of pyridine at a temperature of −30° C. approximately 510 parts of phospherous oxychloride, the addition being made slowly over a period of 3 hours, while the mixture is stirred. The temperature is then allowed to rise to 0° C., the reaction mass is filtered, and dried and toluene is removed. The product is recovered by distillation in vacuo as a fraction boiling at 80° C. under 0.5 mm. Hg pressure.

If a mixture of allyl alcohol and another alcohol is substituted for the allyl alcohol, mixed esters are produced. Owing to different reaction rates of the various alcohols it is advisable to add the alcohols separately, to obtain optimum yields.

I claim:

1. A method of preparing an ion exchange resin which consists in partially hydrolysing a polymer of the class consisting of alkyl-diallyl phosphate polymer and triallyl phosphate polymers wherein the alkyl and allyl radicals contain up to 5 carbon atoms to bring about partial substitution of organic radicals by alkali metal cations, wherein the partial hydrolysis is brought about by heating under reflux 50 parts by weight of said polymer with 600 parts by weight of a 20 percent aqueous sodium hydroxide for approximately three hours.

2. A method according to claim 1 wherein the polymer is partially hydrolysed by treatment with an alkali metal hydroxide and the partially hydrolysed polymer is treated with an aqueous 1N mineral acid solution to produce the acid form of the resin and then repeatedly washing with water until the wash water leaving the polymer is anion free.

References Cited in the file of this patent

UNITED STATES PATENTS

| 2,318,959 | Muskat | May 11, 1943 |
| 2,628,193 | D'Alelio | Feb. 10, 1953 |
| 2,660,543 | Walter et al. | Nov. 24, 1953 |

OTHER REFERENCES

Cavalier: "Compte Rend." 124, 91 (1897) Abstracted by Kosolapoff in "Organo-phosphorus Compounds," pp. 232–3, 253 (1050), John Wiley & Sons, Inc. (Copy in Div. 46.)

Frick et al.: J. Polymer Science, XX, 307–315 (1956). (Copy in Div. 60.)